US006758509B1

(12) United States Patent
Spencer

(10) Patent No.: US 6,758,509 B1
(45) Date of Patent: Jul. 6, 2004

(54) PICK-UP BED SPACE DIVIDER

(76) Inventor: David C. Spencer, 4918 Bayou Vista Dr., Houston, TX (US) 77091

(*) Notice: Subject to any disclaimer, the term of this patent is extended or adjusted under 35 U.S.C. 154(b) by 0 days.

(21) Appl. No.: 10/441,175

(22) Filed: May 20, 2003

(51) Int. Cl.[7] .................................................. B60R 5/04
(52) U.S. Cl. ................................. 296/37.6; 296/100.06
(58) Field of Search .............................. 296/24.3, 24.4, 296/24.1, 37.1, 37.6, 100.01, 100.02, 100.06, 100.07, 100.08, 100.09; 224/402, 403

(56) References Cited

U.S. PATENT DOCUMENTS

| | | | |
|---|---|---|---|
| 4,215,896 A | | 8/1980 | Drouin |
| D261,499 S | | 10/1981 | Sauber |
| 4,451,075 A | * | 5/1984 | Canfield ..................... 296/37.6 |
| 4,749,226 A | * | 6/1988 | Heft .......................... 296/37.6 |
| 4,828,312 A | | 5/1989 | Kinkel et al. |
| 5,207,469 A | | 5/1993 | Rossi |
| 5,232,259 A | * | 8/1993 | Booker ....................... 296/37.6 |
| 5,366,124 A | * | 11/1994 | Dearborn, IV ............... 224/542 |
| 5,853,116 A | | 12/1998 | Schreiner |
| 6,039,379 A | * | 3/2000 | Jordan ........................ 296/37.6 |
| 6,056,177 A | | 5/2000 | Schneider |
| 6,092,852 A | * | 7/2000 | Lawrence ................... 296/37.6 |
| 6,170,724 B1 | | 1/2001 | Carter et al. |
| 6,338,520 B2 | * | 1/2002 | Rusu et al. ............. 296/100.07 |

* cited by examiner

Primary Examiner—D. Glenn Dayoan
Assistant Examiner—Patricia Engle

(57) ABSTRACT

A pick-up bed space divider includes a device for removably positioning in a pick-up bed. The pick-up bed has a bottom wall, a pair of side walls, and a tailgate. The bottom wall has a pair of wheel wells. The device has a first panel having an upper edge, a bottom edge and a pair of side edges. The bottom edge is selectively abutted against the bottom wall and positioned adjacent to the wheel wells. A second panel has a back edge, a front edge, and a pair of lateral edges. A hinge is attached to and pivotally couples the back edge to the upper edge. The second panel has a width between the lateral edges that is greater than a width between the side walls. The second panel abuts an upper edge of the side walls and the tailgate when the second panel is in a horizontal position.

4 Claims, 3 Drawing Sheets

PICK-UP BED SPACE DIVIDER

BACKGROUND OF THE INVENTION

1. Field of the Invention

The present invention relates to pick-up bed storage devices and more particularly pertains to a new pick-up bed storage device for creating a storage area adjacent to a tailgate of a pick-up bed.

2. Description of the Prior Art

The use of pick-up bed storage devices is known in the prior art. While these devices fulfill their respective, particular objectives and requirements, the need remains for a device that may be easily positioned within a pick-up bed without adding hardware on the pick-up bed.

SUMMARY OF THE INVENTION

The present invention meets the needs presented above by providing a device which is retrofittable to existing pick-up bed configurations such that the wheel wells and tailgate of the pick-up bed are used for stabilizing the device.

Another object of the present invention is to provide a new pick-up bed storage device that including a coupling assembly for securing the device to the tailgate.

To this end, the present invention generally comprises a pick-up bed space dividing device for removably positioning in a pick-up bed. The pick-up bed has a bottom wall, a pair of side walls, and a tailgate. The bottom wall has a pair of wheel wells. The device comprises a first panel having an upper edge, a bottom edge and a pair of side edges. The bottom edge is selectively abutted against the bottom wall and positioned adjacent to the wheel wells such that the panel is located between the wheel wells and the tailgate. A second panel has a back edge, a front edge, and a pair of lateral edges. A hinge is attached to and pivotally couples the back edge to the upper edge. The second panel has a width between the lateral edges that is greater than a width between the side walls so that the second panel abuts an upper edge of the side walls and the tailgate when the second panel is in a horizontal position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
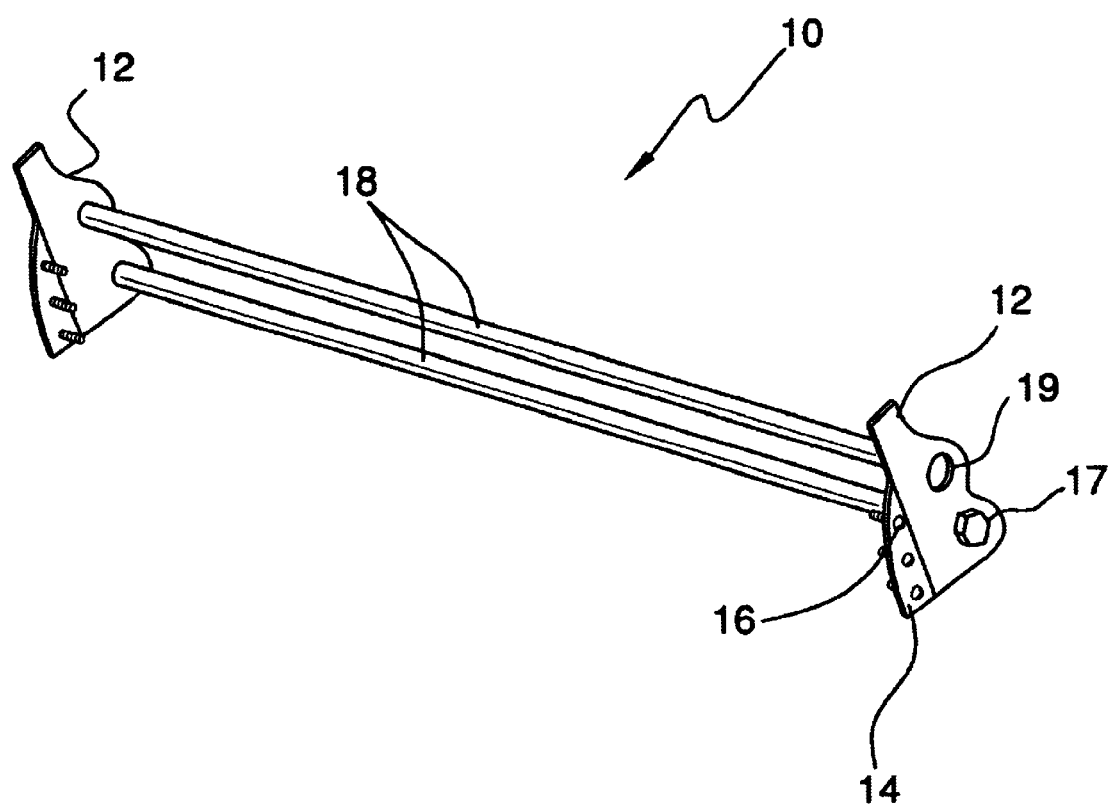
FIG. 1 is a schematic perspective view of a pick-up bed space divider according to the present invention.

With reference now to the drawings, and in particular to FIGS. 1 through 4 thereof, a new pick-up bed storage device embodying the principles and concepts of the present invention and generally designated by the reference numeral 10 will be described.

As best illustrated in FIGS. 1 through 4, the pick-up bed space divider 10 generally comprises a device for removably positioning in a conventional pick-up bed 5 having a bottom wall 6, a pair of side walls 7, and a tailgate 8. The bottom wall 6 has a pair of wheel wells 9 positioned therein, of which only one is shown.

The divider 10 includes a first panel 12 having an upper edge 14, a bottom edge 16 and a pair of side edges 18. The bottom edge 16 is selectively abutted against the bottom wall 6 and positioned adjacent to the wheel wells 9 such that the first panel 12 is located between the wheel wells and the tailgate. A second panel 20 has a back edge 22, a front edge 24, and a pair of lateral edges 26. A hinge 28 is attached to and pivotally couples the back edge 22 to the upper edge 14. The second panel 20 has a width between the lateral edges 26 that is greater than a width between the side walls 7. The length of the second panel 20 from the front edge 24 to the back edge 22 also needs to be at least as long as the distance from the wheel wells 9 to the tailgate 8. Because of the size requirements, the device will generally be retrofitted to existing pick-up beds 5. The second panel 20 abuts an upper edge 30 of the side walls 7 and an upper edge 31 of the tailgate 8 when the second panel 20 is in a horizontal position.

A lip 32 is attached to and extends along a length of the front edge 24 of the second panel 20. The lip 32 extends downward when the second panel 20 is in a horizontal orientation. A coupling assembly 34 for selectively coupling the lip 32 to the tailgate 8 is attached to the lip 32. The coupling assembly 34 includes a latch 36 that is rotatably coupled to an inner surface of the lip 32. The latch 36 is selectively positionable adjacent to an inner surface 42 of the tailgate 8 when the lip 32 is adjacent to an outer surface 44 of the tailgate 8. The coupling assembly 34 may include a lock 38 for securing rotation of the latch 36. A catch 40 would be attached to the inner surface 42 of the tailgate 8 so that the latch 36 may engage the catch 40 in a locked orientation.

In use, the first panel 12 divides the pick-up bed 5 into two sections. When the second panel 20 is positioned on the top edge 30 of the side walls 7, the first panel 12 cannot swing backward because of the position of the wheel wells 9. The coupling assembly 34 prevents the movement of the second panel 20 with respect to the tailgate 8. The space provided below the second panel 20 can be used for securing items, if the coupling assembly 34 is lockable, or simply for organizing the pick-up bed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pick-up bed space dividing device for removably positioning in a pick-up bed, the pick-up bed having a bottom wall, a pair of side walls, and a tailgate, the bottom wall having a pair of wheel wells, said device comprising:

a first panel having an upper edge, a bottom edge and a pair of side edges, said bottom edge being selectively abutted against the bottom wall and positioned adjacent to the wheel wells such that said first panel is located between the wheel wells and the tailgate;

a second panel having a back edge, a front edge, and a pair of lateral edges, a hinge being attached to and pivotally coupling said back edge to said upper edge, said second panel having a width between said lateral edges being greater than a width between the side walls, wherein said second panel abuts an upper edge of the side walls and the tailgate when said second panel is in a horizontal position; and a lip being attached to and extending along a length of said front edge of said second panel, said lip extending downward when said second panel is in a horizontal orientation.

2. The pick-up bed space dividing device of claim 1, further including a coupling assembly being attached to said lip for selectively coupling said lip to the tailgate.

3. The pick-up bed space dividing device of claim 2, wherein said coupling assembly includes a latch being rotatably coupled to an inner surface of said lip, wherein said latch is selectively positionable adjacent to an inner surface of the tailgate when said lip is adjacent to an outer surface of the tailgate.

4. A pick-up bed space dividing device for removably positioning in a pick-up bed, the pick-up bed having a bottom wall, a pair of side walls, and a tailgate, the bottom wall having a pair of wheel wells, said device comprising:

a first panel having an upper edge, a bottom edge and a pair of side edges, said bottom edge being selectively abutted against the bottom wall and positioned adjacent to the wheel wells such that said first panel is located between the wheel wells and the tailgate;

a second panel having a back edge, a front edge, and a pair of lateral edges, a hinge being attached to and pivotally coupling said back edge to said upper edge, said second panel having a width between said lateral edges being greater than a width between the side walls, wherein said second panel abuts an upper edge of the side walls and the tailgate when said second panel is in a horizontal position;

a lip being attached to and extending along a length of said front edge of said second panel, said lip being adapted to extend along the tailgate and downwardly adjacent to an outer face of the tailgate when said second panel is in a horizontal orientation; and a coupling assembly for selectively coupling said lip to the tailgate, said coupling assembly including a latch being rotatably coupled to an inner surface of said lip, wherein said latch is selectively positionable adjacent to an inner surface of the tailgate when said lip is adjacent to an outer surface of the tailgate.

* * * * *

UNITED STATES PATENT AND TRADEMARK OFFICE
CERTIFICATE OF CORRECTION

PATENT NO. : 6,758,509 B1
DATED : July 6, 2004
INVENTOR(S) : Spencer, David C.

Figure 2:
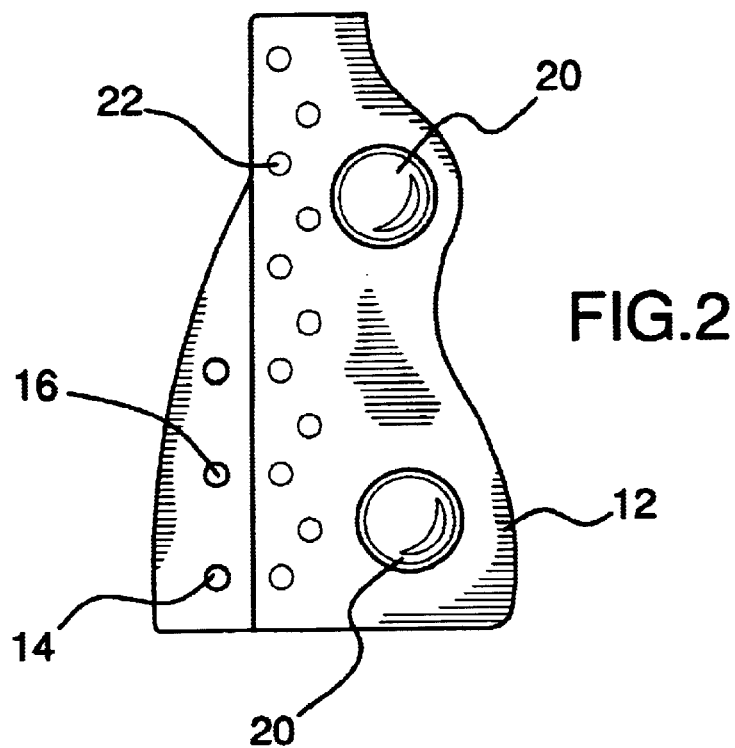
FIG. 2 is a schematic perspective view of the present invention.
Figure 3:
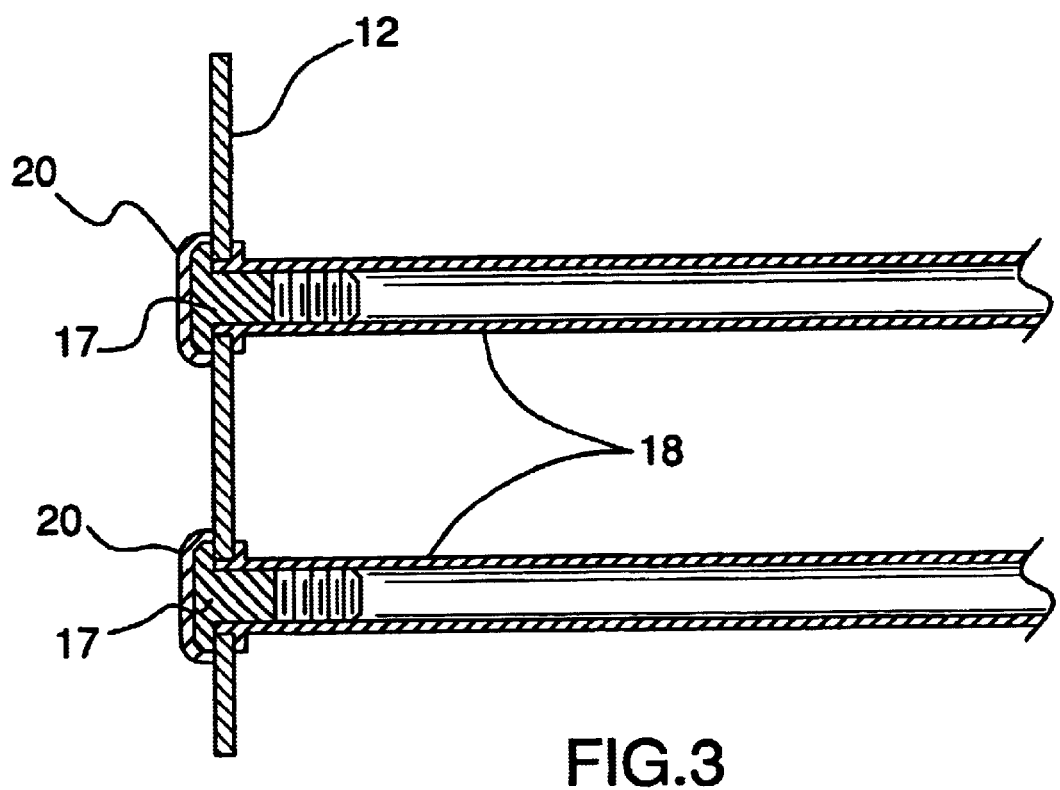
FIG. 3 is a schematic perspective view of the present invention.
Figure 4:
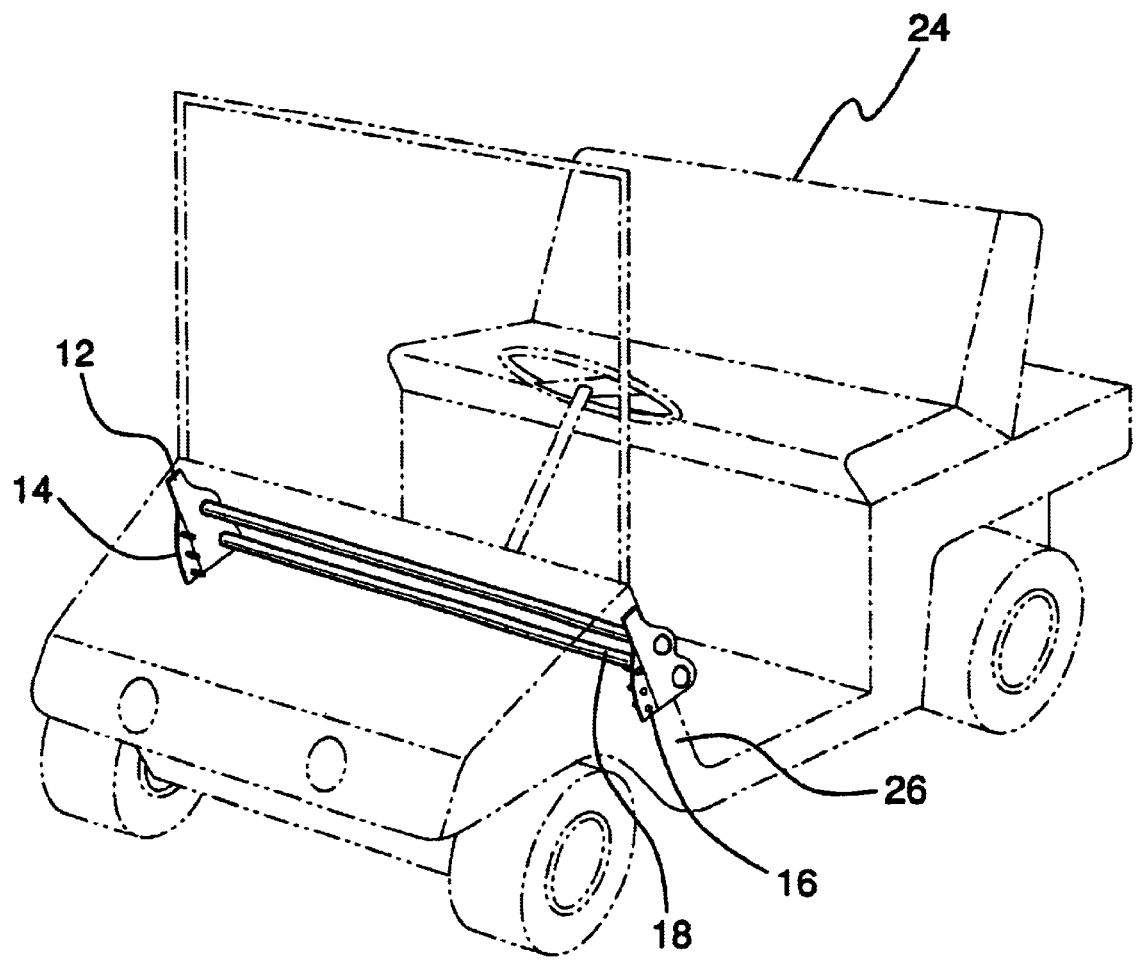
FIG. 4 is a schematic perspective view of the present invention.
Figure 2:
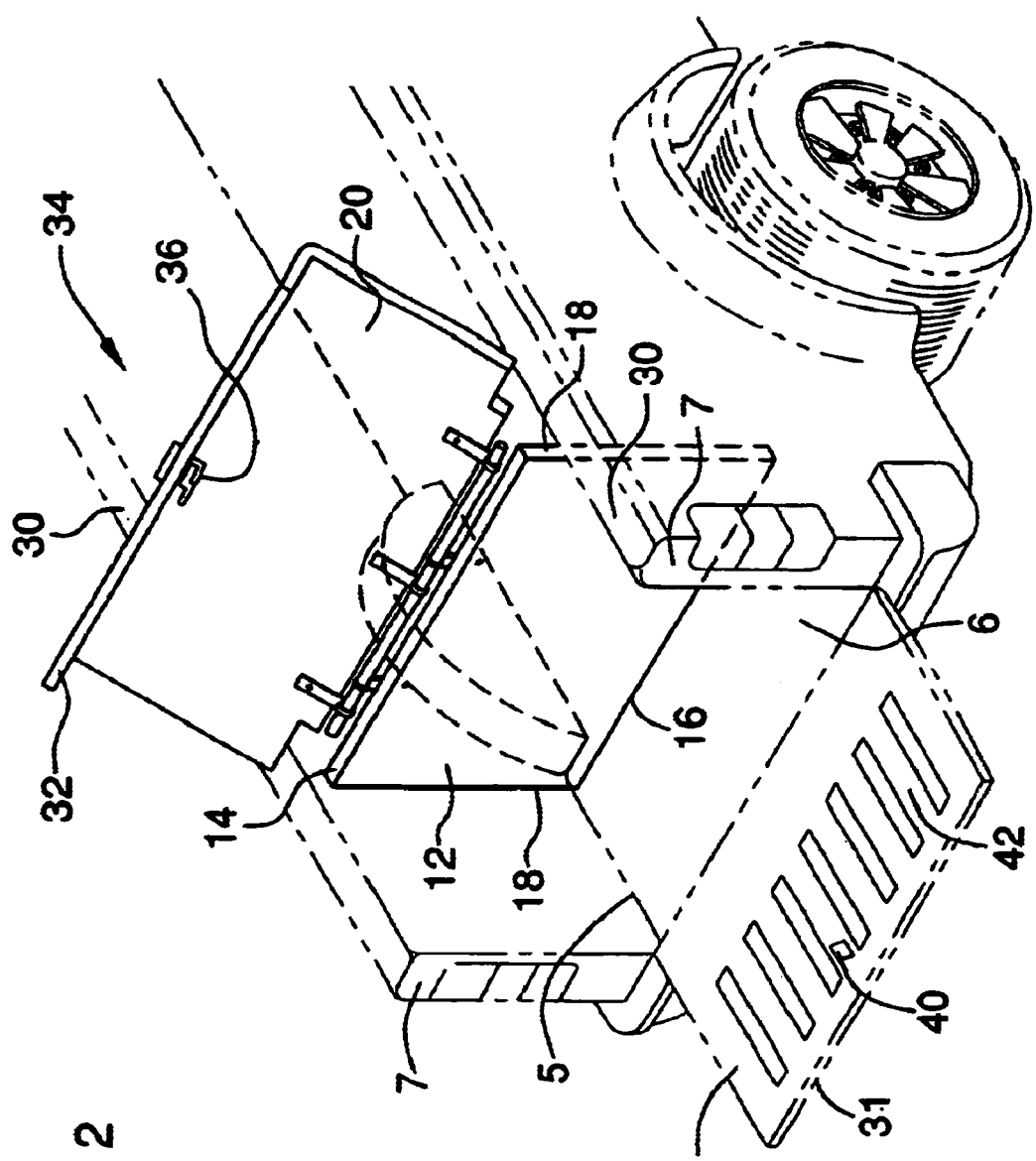

It is certified that error appears in the above-identified patent and that said Letters Patent is hereby corrected as shown below:

Drawings,
Sheet 2, replace Figure 2 with the corrected drawing.

Signed and Sealed this

Eleventh Day of October, 2005

JON W. DUDAS
*Director of the United States Patent and Trademark Office*